(12) United States Patent
Bernheim et al.

(10) Patent No.: US 10,459,411 B2
(45) Date of Patent: Oct. 29, 2019

(54) SYSTEM AND METHOD FOR SINGLE AND MULTIZONAL OPTIMIZATION OF UTILITY SERVICES DELIVERY AND UTILIZATION

(71) Applicants: Astrolink International LLC, Bethesda, MD (US); Dominion Energy Technologies, Inc., Richmond, VA (US)

(72) Inventors: Henrik F. Bernheim, Denver, CO (US); Jerritt H. Hansell, Boulder, CO (US); Marcia R. Martin, Erie, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 32 days.

(21) Appl. No.: 15/257,191

(22) Filed: Sep. 6, 2016

(65) Prior Publication Data

US 2016/0378074 A1 Dec. 29, 2016

Related U.S. Application Data

(63) Continuation of application No. 13/448,005, filed on Apr. 16, 2012, now abandoned.
(Continued)

(51) Int. Cl.
| | | |
|---|---|---|
| *G05B 13/02* | (2006.01) | |
| *G05B 15/02* | (2006.01) | |

(Continued)

(52) U.S. Cl.
CPC .......... *G05B 13/021* (2013.01); *G05B 15/02* (2013.01); *H01F 38/14* (2013.01); *H02J 50/10* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 3,733,586 A | 5/1973 | Lusk et al. | |
| 3,911,415 A | 10/1975 | Whyte | |

(Continued)

FOREIGN PATENT DOCUMENTS

| | | |
|---|---|---|
| CN | 101770007 A | 7/2010 |
| EP | 0395495 A1 | 10/1990 |

(Continued)

OTHER PUBLICATIONS

Extended European Search Report for European Patent Application No. 14754339.1, dated Jan. 16, 2017, 10 pages.

(Continued)

*Primary Examiner* — Carlos R Ortiz Rodriguez
(74) *Attorney, Agent, or Firm* — Withrow & Terranova, PLLC

(57) ABSTRACT

The present invention is directed to utility service delivery wherein distributed intelligence and networking is used in the optimization of the service delivery. The present invention employs a network of data collection nodes and aggregation nodes located on a power grid controlled by a controlling agency. The data collection nodes comprise Intelligent Communicating Devices (ICDs) and Communicating Devices (CDs), which transmit metrics they collect over the power grid from locations near meters or service transformers to the aggregation nodes. Commands, policies, and program updates may be transmitted from a server at an aggregation node to the ICDs and CDs. The ICDs are also capable of issuing control commands to the CDs and grid management devices, acting locally and/or in conjunction with other ICDs, CDs, aggregation nodes, and central con- (Continued)

trolling agencies. Through these communications and commands, utility services delivery and utilization is optimized.

16 Claims, 3 Drawing Sheets

Related U.S. Application Data

(60) Provisional application No. 61/476,083, filed on Apr. 15, 2011.

(51) Int. Cl.
  *H02J 50/80* (2016.01)
  *H02J 50/10* (2016.01)
  *H01F 38/14* (2006.01)

(56) References Cited

U.S. PATENT DOCUMENTS

| | | |
|---|---|---|
| 3,942,170 A | 3/1976 | Whyte |
| 3,944,723 A | 3/1976 | Fong |
| 4,200,770 A | 4/1980 | Hellman et al. |
| 4,361,766 A | 11/1982 | de Montgolfier et al. |
| 4,371,867 A | 2/1983 | Gander |
| 4,568,934 A | 2/1986 | Allgood |
| 4,580,276 A | 4/1986 | Andruzzi, Jr. et al. |
| 4,633,463 A | 12/1986 | Mack |
| 4,668,934 A | 5/1987 | Shuey |
| 4,918,422 A | 4/1990 | Mak |
| 5,463,624 A | 10/1995 | Hogg et al. |
| 5,812,557 A | 9/1998 | Stewart et al. |
| 5,818,725 A | 10/1998 | McNamara et al. |
| 5,987,305 A | 11/1999 | Reitberger |
| 6,144,292 A | 11/2000 | Brown |
| 6,212,560 B1 | 4/2001 | Fairchild |
| 6,366,062 B2 | 4/2002 | Baretich et al. |
| 6,373,399 B1 | 4/2002 | Johnson et al. |
| 6,535,797 B1 | 3/2003 | Bowles et al. |
| 6,650,249 B2 | 11/2003 | Meyer et al. |
| 6,687,110 B2 | 2/2004 | Murray |
| 6,690,655 B1 | 2/2004 | Miner et al. |
| 6,747,994 B2 | 6/2004 | Oses et al. |
| 6,788,702 B1 | 9/2004 | Garcia-Luna-Aceves et al. |
| 6,961,641 B1 | 11/2005 | Forth et al. |
| 7,053,756 B2 | 5/2006 | Mollenkopf et al. |
| 7,058,524 B2 | 6/2006 | Hayes et al. |
| 7,069,117 B2 | 6/2006 | Wilson et al. |
| 7,076,378 B1 | 7/2006 | Huebner |
| 7,188,003 B2 | 3/2007 | Ransom et al. |
| 7,194,528 B1 | 3/2007 | Davidow |
| 7,236,765 B2 | 6/2007 | Bonicatto et al. |
| 7,251,570 B2 | 7/2007 | Hancock et al. |
| 7,280,931 B1 | 10/2007 | Kim et al. |
| 7,319,280 B1 | 1/2008 | Landry et al. |
| 7,323,968 B2 | 1/2008 | Iwamura |
| 7,369,579 B2 | 5/2008 | Logvinov et al. |
| 7,412,338 B2 | 8/2008 | Wynans et al. |
| 7,552,437 B2 | 6/2009 | Di Luoffo et al. |
| 7,571,028 B2 | 8/2009 | Lapinski et al. |
| 7,598,844 B2 | 10/2009 | Corcoran et al. |
| 7,701,330 B2 | 4/2010 | Iwamura |
| 7,808,128 B1 | 10/2010 | Weber, Jr. et al. |
| 7,826,538 B1 | 11/2010 | Weber, Jr. |
| 7,870,600 B2 | 1/2011 | Huotari et al. |
| 7,873,077 B2 | 1/2011 | Downey et al. |
| 7,876,717 B2 | 1/2011 | Iwamura |
| 7,948,255 B2 | 5/2011 | Shim et al. |
| 8,013,570 B2 * | 9/2011 | Baxter ............... B60L 3/0084 320/101 |
| 8,019,483 B2 | 9/2011 | Keefe |
| 8,050,879 B2 | 11/2011 | Koste et al. |
| 8,055,896 B2 | 11/2011 | Jin et al. |
| 8,099,479 B2 | 1/2012 | Saint-Hilaire |
| 8,207,726 B2 | 6/2012 | Vaswani et al. |
| 8,519,832 B2 | 8/2013 | Loporto et al. |
| 8,626,462 B2 | 1/2014 | Kolwalkar et al. |
| 8,639,922 B2 | 1/2014 | Phatak |
| 8,639,992 B2 | 1/2014 | Haufe et al. |
| 8,711,995 B2 | 4/2014 | Glende |
| 8,737,555 B2 | 5/2014 | Haug et al. |
| 8,818,742 B2 | 8/2014 | Ansari |
| 8,872,667 B2 | 10/2014 | Bhageria et al. |
| 9,059,842 B2 | 6/2015 | Bernheim et al. |
| 9,287,933 B2 | 3/2016 | Yu |
| 9,380,545 B2 | 6/2016 | Martin et al. |
| 9,438,312 B2 | 9/2016 | Bernheim et al. |
| 9,654,287 B2 | 5/2017 | Zhao et al. |
| 9,768,613 B2 | 9/2017 | Taft |
| 9,859,712 B2 | 1/2018 | Nishibayashi et al. |
| 9,917,442 B2 | 3/2018 | Beauregard et al. |
| 9,958,925 B2 | 5/2018 | Chapel et al. |
| 2001/0018561 A1 | 8/2001 | Tanida |
| 2001/0037378 A1 | 11/2001 | Hirayama |
| 2001/0055272 A1 | 12/2001 | Matsuno et al. |
| 2002/0009155 A1 | 1/2002 | Tzannes |
| 2002/0069299 A1 | 6/2002 | Rosener et al. |
| 2002/0089927 A1 | 7/2002 | Fischer et al. |
| 2003/0098671 A1 | 5/2003 | Hochgraf |
| 2003/0151491 A1 | 8/2003 | Martin et al. |
| 2004/0062267 A1 | 4/2004 | Minami et al. |
| 2004/0110044 A1 | 6/2004 | McArthur et al. |
| 2004/0160990 A1 | 8/2004 | Logvinov et al. |
| 2004/0184406 A1 | 9/2004 | Iwamura |
| 2004/0218688 A1 | 11/2004 | Santhoff et al. |
| 2004/0226621 A1 | 11/2004 | Phillips et al. |
| 2004/0227621 A1 | 11/2004 | Cope et al. |
| 2005/0005150 A1 | 1/2005 | Ballard |
| 2005/0017848 A1 | 1/2005 | Flen et al. |
| 2005/0018766 A1 | 1/2005 | Iwamura |
| 2005/0043860 A1 | 2/2005 | Petite |
| 2005/0047379 A1 | 3/2005 | Boyden et al. |
| 2005/0063422 A1 | 3/2005 | Lazar et al. |
| 2005/0144437 A1 | 6/2005 | Ransom et al. |
| 2005/0155033 A1 | 7/2005 | Luoffo et al. |
| 2005/0207079 A1 | 9/2005 | Tiller et al. |
| 2005/0253690 A1 | 11/2005 | Crenshaw et al. |
| 2005/0281326 A1 | 12/2005 | Yu |
| 2006/0071757 A1 | 4/2006 | Burghard et al. |
| 2006/0078044 A1 | 4/2006 | Norrell et al. |
| 2006/0091877 A1 | 5/2006 | Robinson et al. |
| 2006/0097573 A1 | 5/2006 | Gidge et al. |
| 2006/0152344 A1 | 7/2006 | Mowery, Jr. |
| 2006/0259199 A1 | 11/2006 | Gjerde et al. |
| 2006/0291575 A1 | 12/2006 | Berkman et al. |
| 2007/0047573 A1 | 3/2007 | Logvinov et al. |
| 2007/0076650 A1 | 4/2007 | Manjeshwar et al. |
| 2007/0100506 A1 | 5/2007 | Teichmann |
| 2007/0101438 A1 | 5/2007 | Govindarajan |
| 2007/0114987 A1 | 5/2007 | Kagan |
| 2007/0162550 A1 | 7/2007 | Rosenberg |
| 2007/0208521 A1 | 9/2007 | Petite et al. |
| 2007/0211401 A1 | 9/2007 | Mak |
| 2007/0237181 A1 | 10/2007 | Cho et al. |
| 2007/0247331 A1 | 10/2007 | Angelis et al. |
| 2007/0271383 A1 | 11/2007 | Kim et al. |
| 2007/0297425 A1 | 12/2007 | Chirco |
| 2008/0040479 A1 | 2/2008 | Bridge et al. |
| 2008/0057866 A1 | 3/2008 | Schwager et al. |
| 2008/0109387 A1 | 5/2008 | Deaver et al. |
| 2008/0187116 A1 | 8/2008 | Reeves et al. |
| 2008/0209481 A1 | 8/2008 | Barrett |
| 2008/0219239 A1 | 9/2008 | Bell et al. |
| 2008/0273521 A1 | 11/2008 | Shao et al. |
| 2008/0312851 A1 | 12/2008 | Kagan et al. |
| 2009/0027061 A1 | 1/2009 | Curt et al. |
| 2009/0060060 A1 | 3/2009 | Stadelmeier et al. |
| 2009/0088907 A1 | 4/2009 | Lewis et al. |
| 2009/0096416 A1 | 4/2009 | Tonewaga et al. |
| 2009/0125351 A1 | 5/2009 | Davis, Jr. et al. |
| 2009/0134699 A1 | 5/2009 | Choi et al. |
| 2009/0187344 A1 | 7/2009 | Brancaccio et al. |
| 2009/0210197 A1 | 8/2009 | Cleary |
| 2009/0219932 A1 | 9/2009 | Kobayashi |

(56) References Cited

U.S. PATENT DOCUMENTS

| | | |
|---|---|---|
| 2009/0238252 A1 | 9/2009 | Shah et al. |
| 2009/0240504 A1 | 9/2009 | Pang et al. |
| 2009/0243838 A1 | 10/2009 | Jones |
| 2009/0256686 A1 | 10/2009 | Abbot et al. |
| 2009/0304101 A1 | 12/2009 | LoPorto et al. |
| 2010/0005273 A1 | 1/2010 | Lee et al. |
| 2010/0007219 A1 | 1/2010 | de Buda et al. |
| 2010/0007336 A1 | 1/2010 | de Buda |
| 2010/0010857 A1 | 1/2010 | Fadell |
| 2010/0040068 A1 | 2/2010 | Wimmer |
| 2010/0054349 A1 | 3/2010 | Spencer |
| 2010/0061433 A1 | 3/2010 | Stadelmeier et al. |
| 2010/0134089 A1 | 6/2010 | Uram et al. |
| 2010/0141392 A1 | 6/2010 | Jo et al. |
| 2010/0180144 A1 | 7/2010 | Groseclose, Jr. et al. |
| 2010/0188260 A1 | 7/2010 | Cornwall et al. |
| 2010/0202471 A1 | 8/2010 | Maki |
| 2010/0217549 A1 | 8/2010 | Galvin et al. |
| 2010/0217550 A1 | 8/2010 | Crabtree et al. |
| 2010/0262313 A1 | 10/2010 | Chambers et al. |
| 2010/0262393 A1 | 10/2010 | Sharma et al. |
| 2010/0286840 A1 | 11/2010 | Powell et al. |
| 2010/0296560 A1 | 11/2010 | Sadan et al. |
| 2010/0296590 A1 | 11/2010 | Takasu |
| 2010/0306533 A1 | 12/2010 | Phatak |
| 2011/0026621 A1 | 2/2011 | Kim et al. |
| 2011/0035073 A1 | 2/2011 | Ozog |
| 2011/0040419 A1 | 2/2011 | Kogler et al. |
| 2011/0040803 A1 | 2/2011 | Pasquero et al. |
| 2011/0043340 A1 | 2/2011 | Kim et al. |
| 2011/0103429 A1 | 5/2011 | Tanaka et al. |
| 2011/0106321 A1 | 5/2011 | Cherian et al. |
| 2011/0109320 A1 | 5/2011 | Curt et al. |
| 2011/0118888 A1 | 5/2011 | White, II |
| 2011/0121654 A1 | 5/2011 | Recker et al. |
| 2011/0122798 A1 | 5/2011 | Hughes et al. |
| 2011/0130991 A1 | 6/2011 | Koste et al. |
| 2011/0130992 A1 | 6/2011 | Kolwalkar et al. |
| 2011/0133655 A1 | 6/2011 | Recker et al. |
| 2011/0140911 A1 | 6/2011 | Pant et al. |
| 2011/0196546 A1 | 8/2011 | Muller et al. |
| 2011/0208468 A1 | 8/2011 | Yamamoto et al. |
| 2011/0212700 A1 | 9/2011 | Petite |
| 2011/0216747 A1 | 9/2011 | Shao et al. |
| 2011/0224935 A1 | 9/2011 | Hampel et al. |
| 2011/0267202 A1 | 11/2011 | Efthymiou et al. |
| 2011/0282508 A1 | 11/2011 | Goutard et al. |
| 2011/0285382 A1 | 11/2011 | Kolwalkar et al. |
| 2012/0020395 A1 | 1/2012 | Domanovitz et al. |
| 2012/0026908 A1 | 2/2012 | Tzannes et al. |
| 2012/0036250 A1 | 2/2012 | Vaswani et al. |
| 2012/0041696 A1 | 2/2012 | Sanderford, Jr. et al. |
| 2012/0052870 A1 | 3/2012 | Habicher |
| 2012/0062210 A1 | 3/2012 | Veillette |
| 2012/0062390 A1 | 3/2012 | Solomon |
| 2012/0068784 A1 | 3/2012 | Varadarajan et al. |
| 2012/0075099 A1 | 3/2012 | Brown |
| 2012/0086459 A1 | 4/2012 | Kim |
| 2012/0123606 A1 | 5/2012 | Mollenkopf et al. |
| 2012/0128080 A1 | 5/2012 | Woo et al. |
| 2012/0136500 A1 | 5/2012 | Hughes |
| 2012/0137126 A1 | 5/2012 | Matsuoka et al. |
| 2012/0139554 A1 | 6/2012 | Parsons |
| 2012/0155557 A1 | 6/2012 | Bush et al. |
| 2012/0158329 A1 | 6/2012 | Hurri et al. |
| 2012/0185838 A1 | 7/2012 | Schwartzman et al. |
| 2012/0195355 A1 | 8/2012 | El-Essawy et al. |
| 2012/0201145 A1 | 8/2012 | Ree et al. |
| 2012/0201155 A1 | 8/2012 | Du et al. |
| 2012/0232915 A1 | 9/2012 | Bromberger |
| 2012/0236879 A1 | 9/2012 | Oksman et al. |
| 2012/0242499 A1 | 9/2012 | Ree |
| 2012/0245869 A1 | 9/2012 | Ansari |
| 2012/0250864 A1 | 10/2012 | Nishibayashi et al. |
| 2012/0262355 A1 | 10/2012 | He et al. |
| 2012/0265355 A1 | 10/2012 | Bernheim et al. |
| 2012/0266209 A1 | 10/2012 | Gooding et al. |
| 2012/0275084 A1 | 11/2012 | Familiant et al. |
| 2012/0275526 A1 | 11/2012 | Hughes |
| 2012/0280565 A1 | 11/2012 | Logvinov |
| 2012/0294342 A1 | 11/2012 | Schneider et al. |
| 2012/0307646 A1 | 12/2012 | Xia et al. |
| 2012/0310424 A1 | 12/2012 | Taft |
| 2012/0310558 A1 | 12/2012 | Taft |
| 2012/0313620 A1 | 12/2012 | Swarztrauber et al. |
| 2012/0314782 A1 | 12/2012 | Boivin et al. |
| 2012/0314868 A1 | 12/2012 | Bernheim et al. |
| 2012/0316696 A1 | 12/2012 | Boardman et al. |
| 2012/0323388 A1 | 12/2012 | Littrell et al. |
| 2012/0327989 A1 | 12/2012 | Zhang |
| 2013/0013232 A1 | 1/2013 | Parwal et al. |
| 2013/0031201 A1 | 1/2013 | Kagan et al. |
| 2013/0034086 A1 | 2/2013 | Martin et al. |
| 2013/0063273 A1 | 3/2013 | Bhageria et al. |
| 2013/0067253 A1 | 3/2013 | Tsuda |
| 2013/0121157 A1 | 5/2013 | Logvinov et al. |
| 2013/0132555 A1 | 5/2013 | Wang et al. |
| 2013/0151177 A1 | 6/2013 | Hughes |
| 2013/0193767 A1 | 8/2013 | Carralero et al. |
| 2013/0194975 A1 | 8/2013 | Vedantham et al. |
| 2013/0204450 A1 | 8/2013 | Kagan et al. |
| 2013/0257452 A1 | 10/2013 | DeLeo et al. |
| 2014/0035372 A1 | 2/2014 | Normoyle et al. |
| 2014/0062719 A1 | 3/2014 | Rowitch |
| 2014/0105313 A1 | 4/2014 | Kim et al. |
| 2014/0118163 A1 | 5/2014 | Li et al. |
| 2014/0125125 A1 | 5/2014 | Wyatt |
| 2014/0140358 A1 | 5/2014 | Kim et al. |
| 2014/0167735 A1 | 6/2014 | Beroset |
| 2014/0172723 A1 | 6/2014 | Borisov et al. |
| 2014/0191568 A1 | 7/2014 | Partovi |
| 2014/0233620 A1 | 8/2014 | Bernheim et al. |
| 2014/0233662 A1 | 8/2014 | Hansell et al. |
| 2014/0236365 A1 | 8/2014 | Martin et al. |
| 2014/0236366 A1 | 8/2014 | Livadaras et al. |
| 2014/0236506 A1 | 8/2014 | Nikovski et al. |
| 2014/0300210 A1 | 10/2014 | Abi-Ackel et al. |
| 2014/0359595 A1 | 12/2014 | Sehgal et al. |
| 2014/0361907 A1 | 12/2014 | Bernheim et al. |
| 2014/0368189 A1 | 12/2014 | Bernheim et al. |
| 2015/0010093 A1 | 1/2015 | Hansell et al. |
| 2015/0316620 A1 | 11/2015 | Luan et al. |
| 2016/0112378 A1 | 4/2016 | Bernheim et al. |
| 2016/0124421 A1 | 5/2016 | Hansell et al. |
| 2016/0127242 A1 | 5/2016 | Bernheim et al. |
| 2016/0164287 A1 | 6/2016 | Bernheim |
| 2016/0204991 A1 | 7/2016 | Martin et al. |
| 2016/0285511 A1 | 9/2016 | Hansell et al. |
| 2016/0302238 A1 | 10/2016 | Martin et al. |
| 2017/0344047 A1 | 11/2017 | Cioraca et al. |

FOREIGN PATENT DOCUMENTS

| | | |
|---|---|---|
| EP | 0629098 A2 | 12/1994 |
| EP | 1901145 A2 | 3/2008 |
| EP | 2330430 A1 | 6/2011 |
| EP | 2566125 A1 | 3/2013 |
| EP | 3116084 A1 | 1/2017 |
| JP | H01106652 A | 4/1989 |
| JP | H09501766 A | 2/1997 |
| JP | 2003258689 A | 9/2003 |
| JP | 2003259696 A | 9/2003 |
| JP | 2003339120 A | 11/2003 |
| JP | 2004015840 A | 1/2004 |
| JP | 2004147063 A | 5/2004 |
| JP | 2005252671 A | 9/2005 |
| JP | 2006262570 A | 9/2006 |
| JP | 2007185083 A | 7/2007 |
| JP | 2008508781 A1 | 3/2008 |
| JP | 2008098812 A | 4/2008 |
| JP | 2008124859 A | 5/2008 |
| JP | 2010156694 A | 7/2010 |
| JP | 2010161923 A | 7/2010 |
| JP | 2010533843 A | 10/2010 |

(56) References Cited

FOREIGN PATENT DOCUMENTS

| | | | |
|---|---|---|---|
| JP | 2010268121 A | 11/2010 |
| JP | 2011525787 A | 9/2011 |
| JP | 2012227928 A | 11/2012 |
| JP | 2012235457 A | 11/2012 |
| JP | 2013005718 A1 | 1/2013 |
| JP | 2013106255 A | 5/2013 |
| WO | 9501030 A1 | 1/1995 |
| WO | 9806187 A1 | 2/1998 |
| WO | 2009067250 A1 | 5/2009 |
| WO | 2010027421 A2 | 3/2010 |
| WO | 2010141859 A1 | 12/2010 |
| WO | 2013006273 A2 | 1/2013 |
| WO | 2013013162 A2 | 1/2013 |
| WO | 2013030937 A1 | 3/2013 |
| WO | 2014006662 A1 | 1/2014 |
| WO | 2014062967 A1 | 4/2014 |
| WO | 2014096911 A1 | 6/2014 |

OTHER PUBLICATIONS

Office Action No. 13556 for Colombian Patent Application No. 15-222367, dated Nov. 28, 2016, 13 pages.
Examination Report No. 1 for Australian Patent Application No. 2014219244, dated Dec. 21, 2016, 4 pages.
Extended European Search Report for European Patent Application No. 14754714.5, dated Jan. 16, 2017, 10 pages.
Extended European Search Report for European Patent Application No. 14808081.5, dated Jan. 30, 2017, 7 pages.
Extended European Search Report for European Patent Application No. 14810273.4, dated Feb. 1, 2017, 12 pages.
Extended European Search Report for European Patent Application No. 14811042.2, dated Jan. 2, 2017, 7 pages.
Examination Report No. 1 for Australian Patent Application No. 2014219246, dated Dec. 22, 2016, 3 pages.
Advisory Action for U.S. Appl. No. 14/304,035, dated Nov. 30, 2016, 3 pages.
Search Report for Japanese Patent Application No. 2011-512749, search date Aug. 14, 2013, 29 pages.
Office Action for Japanese Patent Application No. 2011-512749, drafting date Sep. 4, 2013, 7 pages.
International Preliminary Report on Patentability for PCT/US2014/041396, dated Dec. 17, 2015, 8 pages.
International Preliminary Report on Patentability for PCT/US2014/042300, dated Dec. 23, 2015, 9 pages.
International Preliminary Report on Patentability for PCT/US2014/042393, dated Dec. 23, 2015, 11 pages.
Office Action for Canadian Patent Application No. 2,727,034, dated Nov. 26, 2015, 4 pages.
Decision of Final Rejection for Japanese Patent Application No. 2014-119504, dated Nov. 10, 2015, 5 pages.
Translation of Decision to Grant for Japanese Patent Application No. 2014-119505, dated Dec. 15, 2015, 3 pages.
Office Action for Cuban Patent Application No. 2015-0088, dated Oct. 30, 2015, 3 pages.
Final Office Action for U.S. Appl. No. 13/888,102, dated Dec. 24, 2015, 18 pages.
Non-Final Office Action for U.S. Appl. No. 13/911,849, dated Nov. 24, 2015, 15 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Wetula, Andrzej, "A Hilbert Transform Based Algorithm for Detection of a Complex Envelope of a Power Grid Signals—An Implementation," Journal of Electrical Power Quality and Utilisation, vol. 14, Issue 2, 2008, EPQU Journal, pp. 13-18.
Partial Supplementary European Search Report for European Patent Application No. 14754343.3, dated Feb. 8, 2016, 5 pages.
Extended European Search Report for European Patent Application No. 14754343.3, dated May 24, 2016, 12 pages.
Examination Report for European Patent Application No. 09759619.1, dated May 13, 2016, 7 pages.
Notice of Allowance and Examiner Initiated Interview Summary for U.S. Appl. No. 13/911,849, dated Apr. 5, 2016, 10 pages.
Corrected Notice of Allowance for U.S. Appl. No. 13/911,849, dated May 31, 2016, 4 pages.
Non-Final Office Action for U.S. Appl. No. 14/304,035, dated Feb. 25, 2016, 22 pages.
Final Office Action for U.S. Appl. No. 13/448,005, dated Jun. 6, 2016, 11 pages.
Non-Final Office Action for U.S. Appl. No. 14/720,780, dated Feb. 26, 2016, 7 pages.
Notice of Allowance for U.S. Appl. No. 13/566,481, dated Feb. 26, 2016, 7 pages.
International Search Report and Written Opinion for International Patent Application No. PCT/US2015/058423, dated Jan. 19, 2016, 12 pages.
International Search Report and Written Opinion for International Patent Application No. PCT/US2015/058492, dated Feb. 26, 2016, 18 pages.
International Search Report and Written Opinion for International Patent Application No. PCT/US2015/063752, dated Mar. 24, 2016, 16 pages.
International Preliminary Report on Patentability for International Patent Application No. PCT/US2012/33789, dated Oct. 24, 2013, 10 pages.
International Preliminary Report on Patentability for PCT/US2012/041971, dated Dec. 10, 2013, 6 pages.
International Preliminary Report on Patentability for PCT/US2012/049524, dated Feb. 4, 2014, 7 pages.
Final Office Action for U.S. Appl. No. 13/896,029, dated Jun. 22, 2016, 22 pages.
Final Office Action for U.S. Appl. No. 14/304,035, dated Aug. 26, 2016, 18 pages.
Final Office Action for U.S. Appl. No. 14/720,780, dated Sep. 1, 2016, 9 pages.
Partial Supplementary European Search Report for European Patent Application No. 14754339.1, dated Oct. 4 2016, 6 pages.
European Search Report for European Patent Application No. 14754343.3, dated Jun. 10, 2016, 1 page.
Partial Supplementary European Search Report for European Patent Application No. 14754714.5, dated Oct. 6, 2016, 6 pages.
Non-Final Office Action for U.S. Appl. No. 13/896,029, dated Nov. 10, 2016, 18 pages.
Notice of Allowance for U.S. Appl. No. 13/871,944, dated Oct. 4, 2016, 9 pages.
Non-Final Office Action for U.S. Appl. No. 14/304,648, dated Sep. 7, 2016, 4 pages.
Notice of Allowance for U.S. Appl. No. 14/720,780, dated Nov. 4, 2016, 5 pages.
First Office Action for Chinese Patent Application No. 201480009551.2, dated Jun. 19, 2017, 9 pages.
Extended European Search Report for European Patent Application No. 17173049.2, dated Aug. 11, 2017, 8 pages.
Examination report No. 1 for Australian Patent Application No. 2014277983, dated Jun. 16, 2017, 4 pages.
Non-Final Office Action for U.S. Appl. No. 13/896,029, dated Jul. 20, 2017, 17 pages.
Advisory Action for U.S. Appl. No. 14/304,648, dated Aug. 17, 2017, 3 pages.
Notice of Allowance for U.S. Appl. No. 15/184,642, dated Jul. 13, 2017, 8 pages.
Notice of Allowance for U.S. Appl. No. 15/184,642, dated Jul. 27, 2017, 4 pages.
Notice of Allowance for U.S. Appl. No. 14/929,087, dated Aug. 15, 2017, 9 pages.
First Office Action for Chilean Patent Application No. 2325-2015, dated Jan. 26, 2017, 13 pages.

(56) References Cited

OTHER PUBLICATIONS

First Office Action for Chilean Patent Application No. 2323-2015, dated Jan. 26, 2017, 15 pages.
Office Action No. 11851, Colombian Patent Application No. 15-222367, dated Mar. 17, 2017, 19 pages.
First Office Action for Chilean Patent Application No. 2322-2015, dated Jan. 26, 2017, 15 pages.
First Office Action for Chinese Patent Application No. 201480032631. X, dated Feb. 27, 2017, 5 pages.
First Office Action for Chinese Patent Application No. 201480034010.5, dated Feb. 17, 2017, 7 pages.
Non-Final Office Action for U.S. Appl. No. 15/177,930, dated Mar. 3, 2017, 6 pages.
Final Office Action for U.S. Appl. No. 14/304,648, dated Mar. 9, 2017, 7 pages.
Non-Final Office Action for U.S. Appl. No. 15/184,642, dated Mar. 9, 2017, 5 pages.
Second Office Action for Chinese Patent Application No. 201480032631. X, dated Sep. 4, 2017, 5 pages.
Second Office Action for Chinese Patent Application No. 201480034010.5, dated Aug. 2, 2017, 5 pages.
Final Office Action for U.S. Appl. No. 14/304,035, dated Oct. 5, 2017, 16 pages.
U.S. Appl. No. 13/896,029, filed May 16, 2013.
U.S. Appl. No. 13/871,944, filed Apr. 26, 2013.
U.S. Appl. No. 13/888,102, filed May 6, 2013.
U.S. Appl. No. 15/078,646, filed Mar. 23, 2016.
U.S. Appl. No. 13/911,849, filed Jun. 6, 2013, now U.S. Pat. No. 9,438,312.
U.S. Appl. No. 14/304,035, filed Jun. 13, 2014.
U.S. Appl. No. 14/304,648, filed Jun. 13, 2014.
U.S. Appl. No. 13/448,005, filed Apr. 16, 2012.
U.S. Appl. No. 14/720,780, filed May 23, 2015.
U.S. Appl. No. 13/566,481, filed Aug. 3, 2012, now U.S. Pat. No. 9,380,545.
U.S. Appl. No. 15/184,642, filed Jun. 16, 2016.
U.S. Appl. No. 14/927,783, filed Oct. 30, 2015.
U.S. Appl. No. 14/929,087, filed Oct. 30, 2015.
U.S. Appl. No. 14/958,385, filed Dec. 3, 2015.
Yan, Ping et al., "Study of Linear Models in Steady State Load Flow Analysis of Power Systems," IEEE Power Engineering Society Winter Meeting, vol. 1, Jan. 27-31, 2002, New York, NY, IEEE, pp. 666-671.
Translated Summary of Office Action No. 4963 for Columbian Patent Application No. 15-222371, dated Apr. 5, 2017, 3 pages.
International Preliminary Report on Patentability for International Patent Application No. PCT/US2015/058423, dated May 11, 2017, 8 pages.
International Preliminary Report on Patentability for International Patent Application No. PCT/US2015/058492, dated May 11, 2017, 10 pages.
Non-Final Office Action for U.S. Appl. No. 14/304,035, dated May 17, 2017, 22 pages.
Final Office Action for U.S. Appl. No. 14/304,648, dated May 19, 2017, 7 pages.
Advisory Action for U.S. Appl. No. 14/304,648, dated May 24, 2017, 3 pages.
Non-Final Office Action for U.S. Appl. No. 14/928,783, dated May 8, 2017, 16 pages.
Non-Final Office Action for U.S. Appl. No. 15/177,930, dated Nov. 1, 2017, 14 pages.
Notice of Allowance for U.S. Appl. No. 14/928,783, dated Nov. 6, 2017, 9 pages.
Office Action for Colombian Patent Application No. 15222371, dated Oct. 15, 2017, 9 pages.
First Office Action for Chinese Patent Application No. 201480034011. X, dated Oct. 30, 2017, 16 pages.
Notice of Acceptance for Australian Patent Application No. 2014219246, dated Dec. 5, 2017, 3 pages.

Office Action for Mexican Patent Application No. MX/a/2015/017231, dated Oct. 20, 2017, 13 pages.
Advisory Action for U.S. Appl. No. 14/304,035, dated Dec. 29, 2017, 3 pages.
Author Unknown, "MicroPianet® Voltage Regulators," EnergyIdeas Clearinghouse PTR #6.4, Product and Technology Review, Jun. 2008, 6 pages, http://www.energyideas.org/documents/factsheets/PTR/Microplanet.pdf.
Author Unknown, "Prime Alliance Official Website," Web, Date Accessed: Nov. 4, 2015, 3 pages, http://www.prime-alliance.org.
Author Unknown, "The G3 PLC Alliance Unveils its Interoperability process," The G3-PLC Alliance, Oct. 8, 2012, Paris, France, http://www.g3-plc.com/content/press-releases, p. 1.
Author Unknown, "TWACS Low Frequency Power Line Communication Signals Problematic to Public Health," dated May 3, 2013, 20 pages, http://www.eiwellspring.org/smartmeter/TWACS.pdf.
Author Unknown, "Universal Powerline Bus Communication Technology Overview," Powerline Control Services, Jan. 8, 2002, 13 pages, http://pulseworx.com/downloads/upb/UpbOverview.pdf.
Baggini, Angelo "Handbook of Power Quality" John Wiley & Sons, Ltd., 2008, 65 pages.
Bates, Michael, "CVR has Potential Beyond Pushing Efficiencies on Feeders." renewGRID, Mar. 26, 2012, 2 pages, http://www.renew-grid.com/e107plugins/contenl/contenl/php?contenl.8215.
Bresesti, Paola et al., "SDNO: Smart Distribution Network Operation Project", Power Engineering Society General Meeting, IEEE, 2007, 4 pages.
Choi, Moonsuk et al., "Design of Integrated Meter Reading System based on Power-Line Communication", Power-Line Communications and Its Applications, IEEE, International Symposium, 2008, pp. 280-284.
Collins, Dermot et al., "Transmission on Power Line Cables," Telektronikk, vol. 95, No. 2/3, 1999, pp. 134-137.
Dilek, M., "Integrated Design of Electrical Distribution Systems: Phase Balancing and Phase Prediction Case Studies," Dissertation, 2001, 150 pages, http://scholar.lib.vt.edu/theses/available/etd-11132001-222401/.
Goh, Chong Hock K., "A Current Study of Automatic Meter Reading Solutions via Power Line Communications," 19 pages, http://wpweb2k.gsia.cmu.edu/ceic/publicatons.htm. (Published 2003 or later as evidenced by the bibliography).
Ha, K. A., "Power Line Communication Technology," Presentation at Hong Kong Institute of Engineers Seminar on Last Mile Technology, Jun. 20, 2003, 24 pages.
Hooijen, Olaf G. "A Channel Model for the Residential Power Circuit Used as a Digital Communications Medium," IEEE Transactions on Electromagnetic Compatibility, vol. 40, No. 4, Nov. 1998, pp. 331-336.
McGhee, Jim et al., "Smart High Voltage Substation based on IEC 61850 Process Bus and IEEE 1588 Time Synchronization" 2010 First IEEE International Conference on Smart Grid Communications, IEEE, Oct. 4-6, 2010, pp. 489-494.
Mitchell, Travis, "Dominion Conservation Voltage Reduction software reduces energy use by 2.8%," Fierce Energy Daily, Sep. 27, 2011, 3 pages, http://www.fierceenergy.com/story/dominion-conservation-voltage-reduction-soflware-reduces-energy-use-28/2011-09-27.
Montoya, Luis F.,"Power Line Communications Performance Overview of the Physical Layer of Available Protocols," Thesis of Research, University of Florida, Gainesville, Florida, Date Unknown, pp. 1-15.
Moreno-Munoz A., et al., "Integrating Power Quality to Automated Meter Reading", IEEE Industrial Electronics Magazine, IEEE, US, vol. 2, No. 2, Jun. 17, 2008, pp. 10-18.
Newbury, John, "Efficient Communication Services Using the Low Voltage Distribution Line," Proceedings of 2002 PES Winter Meeting, IEEE, 2002, pp. 579-591.
Nyack, Cuthbert A., "Convolution and Autocorrelation," Web, Date Accessed: Nov. 4, 2015, 3 pages, http://cnyack.homestead.com/files/aconv/convau1.htm.
Pallares-Lopez et al., "Embedding synchronism in SmartGrid with IEEE1588-based for Intelligent Electronics," 2010 First IEEE Inter-

(56) References Cited

OTHER PUBLICATIONS national Conference on Smart Grid Communications, published/presented Oct. 4-6, 2010, Gaithersburg, Maryland, 7 pages.
Pavlidou, Niovi et al., "Power Line Communications: State of the Art and Future Trends," IEEE Communications Magazine, IEEE, vol. 41, No. 4, Apr. 2003, pp. 34-40.
Rye, Dave, "The X-10 Powerhouse Power Line Interface Model #PL513 and Two-Way Power Line Interface Model #TW523," X-10 Inc., X-10.RTM. Powerhouse (TM) Technical Note, Revision 2A, 1991, 12 pages.
Schickhuber, Gerald et al., "Control Using Power Lines—A European View," Computing & Control Engineering Journal, vol. 8, No. 4, Aug. 1997, pp. 180-184.
Sherman et al, "Location Authentication through Power Line Communication: Design, Protocol, and Analysis of a New Out of Band Strategy," Cyber Defense Lab, Department of CSEE, University of Maryland, Baltimore County, IEEE, 2010, pp. 279-284.
Van Rensburg, Petrus A. Hanse et al., "Design of a Bidirectional Impedance-Adapting Transformer Coupling Circuit for Low-Voltage Power-Line Communications," IEEE Transactions on Power Delivery, IEEE, vol. 20, No. 1, Jan. 2005, pp. 64-70.
International Search Report for PCT/US2014/016538, dated Jun. 16, 2014, 3 pages.
International Preliminary Report on Patentability for PCT/US2014/016538, dated Sep. 3, 2015, 10 pages.
International Search Report for PCT/US2014/016540, dated Jun. 17, 2014, 3 pages.
International Preliminary Report on Patentability for PCT/US2014/016540, dated Sep. 3, 2015, 9 pages.
International Search Report for PCT/US2014/016535, dated Jun. 3, 2014, 2 pages.
International Preliminary Report on Patentability for PCT/US2014/016535, dated Sep. 3, 2015, 8 pages.
International Search Report and Written Opinion for PCT/US2014/041396, dated Oct. 29, 2014, 12 pages.
International Search Report and Written Opinion for PCT/US2014/042300, dated Oct. 20, 2014, 16 pages.
International Search Report and Written Opinion for PCT/US2014/042393, dated Oct. 20, 2014, 15 pages.
International Search Report for PCT/US2009/046644, dated Mar. 2, 2010, 7 pages.
International Preliminary Report on Patentability for PCT/US2009/046644, dated Dec. 6, 2010, 10 pages.
International Search Report for PCT/US2012/033789, dated Sep. 6, 2012, 4 pages.
International Search Report for PCT/US2012/041971, dated Dec. 7, 2012, 5 pages.
International Search Report for PCT/US2012/049524, dated Jan. 3, 2013, 3 pages.
Non-Final Office Action for U.S. Appl. No. 13/566,481, dated Aug. 7, 2015, 27 pages.
Non-Final Office Action for U.S. Appl. No. 13/493,983, dated Feb. 5, 2014, 11 pages.
Final Office Action for U.S. Appl. No. 13/493,983, dated Oct. 31, 2014, 12 pages.
Non-Final Office Action for U.S. Appl. No. 13/448,005, dated Sep. 11, 2014, 20 pages.
Non-Final Office Action for U.S. Appl. No. 13/448,005, dated Apr. 15, 2015, 22 pages.
Non-Final Office Action for U.S. Appl. No. 12/480,493, dated Jul. 16, 2012, 24 pages.
Notice of Allowance and Examiner-Initiated Interview Summary for U.S. Appl. No. 12/480,493, dated Jun. 20, 2013, 13 pages.
Non-Final Office Action for U.S. Appl. No. 13/896,029, dated Sep. 18, 2015, 16 pages.
Non-Final Office Action for U.S. Appl. No. 13/871,944, dated Oct. 16, 2015, 13 pages.
Non-Final Office Action for U.S. Appl. No. 13/888,102, dated Jul. 9, 2015, 18 pages.
Examination Report No. 1 for Australian Patent Application No. 2014219247, dated Apr. 26, 2017, 4 pages.
Second Office Action for Chilean Patent Application No. 2323-2015, dated May 17, 2017, 14 pages
Second Office Action for Chilean Patent Application No. 2322-2015, dated May 17, 2017, 13 pages.
First Office Action for Chinese Patent Application No. 201480009549.5, dated May 31, 2017, 9 pages.
Examination Report No. 1 for Australian Patent Application No. 2014277951, dated Jun. 8, 2017, 4 pages.
Office Action Summary for Columbian Patent Application No. 7058, dated Jun. 16, 2017, 2 pages.
International Preliminary Report on Patentability for International Patent Application No. PCT/US2015/063752, dated Jun. 15, 2017, 12 pages.
Non-Final Office Action for U.S. Appl. No. 13/871,944, dated Jun. 15, 2017, 14 pages.
Final Office Action for U.S. Appl. No. 15/177,930, dated Jul. 26, 2018, 17 pages.
Corrected Notice of Allowability for U.S. Appl. No. 14/928,783, dated Jul. 30, 2018, 6 pages.
Final Office Action for U.S. Appl. No. 14/958,385, dated Jul. 26, 2018, 21 pages.
Corrected Notice of Allowability for U.S. Appl. No. 14/928,783, dated Aug. 10, 2018, 6 pages.
Berger, L. T., et al., "Power Line Communications for Smart Grid Applications," Journal of Electrical and Computer Engineering, vol. 2013, Article ID 712376, Accepted Dec. 29, 2012, 16 pages.
Hauser, C. H., et al., "A Failure to Communicate: Next Generation Communication Requirements, Technologies, and Architecture for the Electric Power Grid," IEEE Power and Energy Magazine, vol. 3, Issue 2, Mar.-Apr. 2005, pp. 47-55.
Kang, J.-M., et al., "Design and Implementation of Network Management System for Power Line Communication Network," 2007 IEEE International Symposium on Power Line Communications and Its Adaptations, Mar. 26-28, 2007, Pisa, Italy, pp. 23-28.
Kim, Y., et al., "PLC technology of KEPCO," 2005 International Symposium on Power Line Communications and Its Applications, Apr. 6-8, 2005, Vancouver, British Columbia, Canada, pp. 390-393.
Papadopoulos, T. A., et al., Low-Voltage Distribution Line Performance Evaluation for PLC Signal Transmission, IEEE Transactions on Power Delivery, vol. 23, Issue 4, Oct. 2008, pp. 1903-1910.
Non-Final Office Action for U.S. Appl. No. 15/078,646, dated Jun. 15, 2018, 33 pages.
Supplemental Notice of Allowability for U.S. Appl. No. 14/304,035, dated May 24, 2018, 6 pages.
Non-Final Office Action for U.S. Appl. No. 14/304,648, dated Jun. 13, 2018, 13 pages.
Corrected Notice of Allowance for U.S. Appl. No. 14/928,783, dated Jun. 8, 2018, 6 pages.
Official Action No. 5493 for Colombian Patent Application No. NC2017/0010584, dated May 4, 2018, 35 pages.
First Official Action for Mexican Patent Application No. MX/a/2015/017227, dated Apr. 11, 2018, 6 pages.
Notice of Acceptance for Australian Patent Application No. 2014277983, dated Jun. 25, 2018, 3 pages.
Notification of Reasons for Refusal for Japanese Patent Application No. 2016-519676, dated Jun. 12, 2018, 7 pages.
Extended European Search Report for European Patent Application No. 18152637.7, dated Apr. 26, 2018, 8 pages.
Notice of Acceptance for Australian Patent Application No. 2014219247, dated Apr. 11, 2018, 3 pages.
Second Examination Report for Australian Patent Application No. 2014277983, dated Mar. 15, 2018, 4 pages.
Second Official Action for Mexican Patent Application No. MX/a/2015/017231, dated Feb. 28, 2018, 5 pages.
Notice of Acceptance for Australian Patent Application No. 2014277951, dated Mar. 28, 2018, 3 pages.
Extended European Search Report for European Patent Application No. 15865305.5, dated May 3, 2018, 8 pages.
Advisory Action for U.S. Appl. No. 14/958,385, dated Sep. 26, 2018, 3 pages.

(56) References Cited

OTHER PUBLICATIONS

Non-Final Office Action for U.S. Appl. No. 13/896,029, dated Oct. 2, 2018, 19 pages.
Supplemental Notice of Allowability for U.S. Appl. No. 14/304,035, dated Apr. 18, 2018, 6 pages.
Non-Final Office Action for U.S. Appl. No. 15/934,499, dated May 7, 2018, 30 pages.
Non-Final Office Action for U.S. Appl. No. 15/450,153, dated Apr. 19, 2018, 10 pages.
Notice of Allowance for U.S. Appl. No. 14/928,783, dated May 9, 2018, 9 pages.
Interview Summary for U.S. Appl. No. 14/958,385, dated Apr. 6, 2018, 3 pages.
Final Office Action for U.S. Appl. No. 13/896,029, dated Jan. 24, 2018, 22 pages.
Notice of Allowance for U.S. Appl. No. 13/871,944, dated Feb. 23, 2018, 18 pages.
Notice of Allowance for U.S. Appl. No. 14/304,035, dated Feb. 7, 2018, 9 pages.
Corrected Notice of Allowance for U.S. Appl. No. 14/928,783, dated Jan. 23, 2018, 6 pages.
Corrected Notice of Allowance for U.S. Appl. No. 14/928,783, dated Feb. 15, 2018, 6 pages.
Notice of Allowance for U.S. Appl. No. 15/852,496, dated Mar. 8, 2018, 9 pages.
Non-Final Office Action for U.S. Appl. No. 14/958,385, dated Jan. 12, 2018, 33 pages.
International Telecommunications Union, "ITU-T G.9960, Series G: Transmission Systems and Media, Digital Systems and Networks," Dec. 1, 2011, 160 pages.
International Telecommunications Union, "Updated draft text for ITU-T G.9961, Series G: Transmission Systems and Media, Digital Systems and Networks—Amendment 1 Corrigendum 1," ITU-T: Telecommunication Standardization Sector, Study Group 15, Amendment approved Sep. 21, 2012, 82 pages.
International Telecommunications Union, "ITU-T G.9961, Series G: Transmission Systems and Media, Digital Systems and Networks," Apr. 1, 2014, 306 pages.
First Office Action for Chinese Patent Application No. 201480009550.8, dated Jan. 26, 2018, 4 pages.
Decision to Grant a Patent for Japanese Patent Application No. 2015-558888, dated Jan. 30, 2018, 4 pages.
Notice of Reasons for Rejection for Japanese Patent Application No. 2015-558889, dated Jan. 23, 2018, 7 pages.
Extended European Search Report for European Patent Application No. 17203296.3, dated Feb. 15, 2018, 8 pages.
Second Office Action for Chinese Patent Application No. 201480009549.5, dated Jan. 23, 2018, 4 pages.
Notice of Reasons for Rejection for Japanese Patent Application No. 2015-558887, dated Jan. 23, 2018, 7 pages.
Notice of Reasons for Rejection for Japanese Patent Application No. 2016-518052, dated Feb. 20, 2018, 8 pages.
Third Office Action for Chinese Patent Application No. 201480034010.5, dated Jan. 17, 2018, 4 pages.
Notice of Reasons for Rejection for Japanese Patent Application No. 2016-519694, dated Feb. 27, 2018, 11 pages.
First Examination Report for Indian Patent Application No. 13/CHENP/2011, dated Jan. 11, 2018, 6 pages.
Office Action for Canadian Patent Application No. 2,870,452, dated Dec. 28, 2017, 4 pages.
Office Action for Canadian Patent Application No. 2,874,132, dated Jan. 25, 2018, 3 pages.
Extended European Search Report for European Patent Application No. 15853935.3, dated Feb. 15, 2018, 10 pages.
Extended European Search Report for European Patent Application No. 15855864.3, dated Feb. 21, 2018, 9 pages.
First Official Action for Mexican Patent Application No. MX/a/2017/005506, dated Jun. 8, 2018, 6 pages.
First Official Action for Mexican Patent Application No. MX/a/2017/005005, dated May 30, 2018, 4 pages.
First Official Action for Mexican Patent Application No. MX/a/2017/006836, dated Jun. 1, 2018, 6 pages.
Official Action for Mexican Patent Application No. MX/a/2015/010689, dated Jan. 25, 2019, 6 pages.
Official Action for Mexican Patent Application No. MX/a/2015/010688, dated Jan. 25, 2019, 8 pages.
Examination Report for Australian Patent Application No. 2014274664, dated Feb. 15, 2019, 2 pages.
Examination Report for European Patent Application No. 14810273.4, dated Mar. 21, 2019, 11 pages.
First Office Action for Chinese Patent Application No. 201580059331.5, dated Mar. 5, 2019, 11 pages.
Notice of Acceptance for Australian Patent Application No. 2017279752, dated Apr. 12, 2019, 3 pages.
Examination Report for Australian Patent Application No. 2015338943, dated Apr. 5, 2019, 3 pages.
Office Action for Canadian Patent Application No. 2,874,132, dated Jan. 3, 2019, 3 pages.
Second Official Action for Mexican Patent Application No. MX/a/2017/006836, dated Dec. 6, 2018, 8 pages.
Official Action for Mexican Patent Application No. MX/a/2015/016809, dated Jan. 14, 2019, 4 pages.
Examinees Report for Canadian Patent Application No. 2,870,452, dated Oct. 2, 2018, 4 pages.
Examination Report for European Patent Application No. 15853935.3, dated Oct. 22, 2018, 5 pages.
Non-Final Office Action for U.S. Appl. No. 15/177,930, dated Nov. 29, 2018, 15 pages.
Final Office Action for U.S. Appl. No. 15/450,153, dated Nov. 28, 2018, 7 pages.
Final Office Action for U.S. Appl. No. 15/934,499, dated Nov. 19, 2018, 34 pages.
Final Office Action for U.S. Appl. No. 14/304,648, dated Nov. 29, 2018, 12 pages.
Notice of Not Fully Responsive Reply for Applications Under Accelerated Examination for U.S. Appl. No. 15/078,646, mailed Jan. 24, 2019, 8 pages.
Advisory Action and AFCP 2.0 Decision for U.S. Appl. No. 15/934,499, dated Jan. 30, 2019, 4 pages.
Non-Final Office Action for U.S. Appl. No. 14/958,385, dated Mar. 18, 2019, 24 pages.
U.S. Appl. No. 15/177,930, filed Jun. 9, 2016.
First Substantive Report for Chilean Patent Application No. 201701036, dated Jul. 20, 2018, 17 pages.
Second Substantive Report for Chilean Patent Application No. 201701038, dated Sep. 3, 2018, 28 pages.
Second Substantive Report for Chilean Patent Application No. 201701394, dated Sep. 12, 2018, 10 pages.
Examination Report No. 1 for Australian Patent Application No. 2017279752, dated Sep. 18, 2018, 6 pages.
Decision to Grant for Japanese Patent Application No. 2016-519676, dated Apr. 16, 2019, 4 pages.
Examination Report No. 1 for Australian Patent Application No. 2015358448, dated May 6, 2019, 3 pages.
Third Official Action for Mexican Patent Application No. MX/a/2017/006836, dated Jun. 4, 2019, 7 pages.
Final Office Action for U.S. Appl. No. 13/896,029, dated Jun. 14, 2019, 21 pages.
Final Office Action for U.S. Appl. No. 15/177,930, dated Jun. 27, 2019, 16 pages.
Non-Final Office Action for U.S. Appl. No. 14/304,648, dated Apr. 29, 2019, 14 pages.
Applicant-Initiated Interview Summary for U.S. Appl. No. 14/958,385, dated Jun. 11, 2019, 6 pages.
Applicant-Initiated Interview Summary for U.S. Appl. No. 14/958,385, dated Jun. 12, 2019, 5 pages.
Notice of Allowance for U.S. Appl. No. 15/177,930, dated Sep. 13, 2019, 10 pages.
Notice of Allowance for U.S. Appl. No. 15/078,646, dated Jul. 17, 2019, 11 pages.
Final Office Action for U.S. Appl. No. 14/958,385, dated Aug. 23, 2019, 30 pages.

(56) References Cited

OTHER PUBLICATIONS

Feng, Yang, "Solving for the Low-Voltage/Large-Angle Power-Flow Solutions by Using the Holomorphic Embedding Method," Doctoral Dissertation, Arizona State University, Aug. 2015, 220 pages.

Xu, Dan, et al., "Project 32: Optimal Topology Discovery for Automatic Meter Reading Using Powerline Carrier," Part 4 Project Final Report, Department of Electrical and Electronic Engineering, University of Auckland, New Zealand, 2003, 53 pages.

Non-Final Office Action for U.S. Appl. No. 15/395,656, dated Sep. 16, 2019, 14 pages.

Karl, M. et al., "Selection of an Optimal Modulation Scheme for Digital Communications over Low Voltage Power Lines," Proceedings of ISSSTA'95, International Symposium on Spread Spectrum Techniques and Applications, Sep. 1996, Mainz, Germany, IEEE, pp. 1087-1091.

Pimentel, P.R.S. et al., "Revolution in the Distribution (Use of the technology Power Line Communication in the transmission of Data, Voice, and Images," 2004 IEEE/PES Transmission & Distribution Conference & Exposition: Latin America, Nov. 8-11, 2004, Sao Paulo, Brazil, IEEE, pp. 314-320.

Notice of Acceptance for Australian Patent Application No. 2014274664, dated Sep. 2, 2019, 8 pages.

Examination Report No. 1 for Australian Patent Application No. 2018203997, dated Aug. 2, 2019, 4 pages.

Summons to Attend Oral Proceedings for European Patent Application No. 09759619.1, dated Jun. 26, 2019, 8 pages.

\* cited by examiner

Message path of EVs requesting charging (via the CD in the vehicle and/or the home charging station) and receiving grants or denials or timing of charging from the ICD based upon the real-time load on the service transformer (shown in blue)

SYSTEM AND METHOD FOR SINGLE AND MULTIZONAL OPTIMIZATION OF UTILITY SERVICES DELIVERY AND UTILIZATION

CROSS REFERENCE TO RELATED APPLICATIONS

This application is a continuation of co-pending U.S. patent application Ser. No. 13/448,005, filed on Apr. 16, 2012, entitled "SYSTEM AND METHOD FOR SINGLE AND MULTIZONAL OPTIMIZATION OF UTILITY SERVICES DELIVERY AND UTILIZATION," which claims the benefit of U.S. Provisional Application No. 61/476,083, filed on Apr. 15, 2011, entitled "SYSTEM AND METHOD FOR SINGLE AND MULTI ZONAL OPTIMIZATION OF UTILITY SERVICES DELIVERY AND UTILIZATION," the disclosures of each of which are hereby incorporated herein by reference in their entireties.

BACKGROUND OF THE INVENTION

1. Technical Field

The present invention is directed generally toward utility service delivery and the use of distributed intelligence and networking in the optimization of utility, especially electrical, service delivery. Applications in this field are popularly characterized as "Smart Grid" applications.

2. Background

The electrical grid in the United States and most other areas of the world is historically divided into two networks: the transmission grid, and the distribution grid. The transmission grid originates at a generation point, such as a coal-burning or atomic power plant, or a hydroelectric generator at a dam. DC power is generated, converted to high-voltage AC, and transmitted to distribution points, called distribution substations, via a highly controlled and regulated, redundant, and thoroughly instrumented high-voltage network which has at its edge a collection of distribution substations. Over the last century, as the use of electrical power became more ubiquitous and more essential, and as a complex market in the trading and sharing of electrical power emerged, the technology of the transmission grid largely kept pace with the technological requirements of the market.

The second network, the distribution grid, is the portion of the electrical grid which originates at the distribution substations and has at its edge a collection of residential, commercial, and industrial consumers of energy. In contrast to the transmission grid, the technology of the distribution grid has remained relatively static since the mid-1930s until very recent years. Today, as concern grows over the environmental effects of fossil fuel usage and the depletion of non-renewable energy sources, electrical distribution technology is increasingly focused on optimization of the distribution grid. The goals of this optimization are energy conservation, resource conservation, cost containment, and continuity of service.

To optimize electrical service delivery, the operators of the network must be able to quantify and anticipate the demand for power that the distribution grid is expected to provide. To achieve the goals of conservation, cost containment, and continuity of service, it is also necessary to be able to manage and sometimes curtail that demand.

Historically, utilities acquired information about household and commercial usage only when meters were read. Thus, load profiles were based on historical data year to year and on trend analysis as the characteristics of the loads changed. Because of this paucity of information, the utilities have been forced to over-deliver service, so that, for example, a standard outlet or socket in a consumer residence might deliver 122V AC when the loading devices used there are designed and rated to operate at as low as 110 V AC. This disparity provides a substantial opportunity for conservation, but the opportunity cannot be realized without better information about the pattern of demand.

The earliest attempts at conservation voltage reduction were made at the substation level, using instrumentation at the substation and a load-tap changer on the substation transformer. This coarse-grained method is effective for keeping voltages at the load points within specifications, but, to keep some end points from being under-served, requires a safety margin to be employed that results in most end points being slightly over-served, as described above. Finer-grained information is necessary to achieve substantial improvements in conservation.

One well-known experiment in the prior art of conservation voltage reduction involved attaching individual voltage regulators to private residences at the metered point. This model provides significant immediate benefits to individual residential accounts, but utilities must wait for historical data to realize gains such as reduced use of "peaker" plants and avoiding purchasing energy on the spot market. Utilities require finer-grained load pattern data in near-real-time to achieve such gains during the first year of operation of a CVR program.

One potential source of such fine-grained data is communicating "smart meters" which can report voltages. This approach has been piloted and yielded reductions in power usage up to 3%. Because the effective bandwidth per meter of the typical radio-based AMI mesh network does not permit every meter to report its voltage fluctuations frequently in near-real-time throughout the day, these solutions sample only a limited selection of load points in real-time. The load projections and data thus obtained can be used to drive demand management applications because the smart meters are capable of two-way communications.

Another approach to the conservation problem has been the use of in-facility displays of real-time energy usage, engaging the consumer in the activity of reducing demand. While these techniques are effective for commercial and industrial consumers with automated facility management systems, efforts to engage residential consumers in actively managing their own consumption have met with limited success. Residential systems for energy management are an application of Home Area Networking (HAN).

SUMMARY OF THE INVENTION

The present invention employs a network of data collection nodes, comprising Communicating Devices (CDs) and Intelligent Communicating Devices (ICDs) which transmit the metrics they collect directly over the power distribution grid from edge locations at meters and/or service transformers to an aggregation node. The aggregation node may be located where the controlling agency for utility service applications resides, such as at a distribution substation. The aggregation nodes consist of a receiver that monitors each phase of one or more feeders at the distribution substation, a computer server that receives and stores transmissions from the ICDs and publishes them on a conventional wide-area network attached to the computer server, and a transmitter controlled by the computer server whereby commands, policies, and program updates may be transmitted from the server to the ICDs and CDs. The Communicating Devices are capable of two-way communication with an ICD sited on the low-voltage side of the service transformer powering the CD. The ICDs can aggregate and cache data collected both locally and from CDs, and execute locally stored programs which cause the collected data to be transmitted using a long-range on-grid protocol to the substation or aggregation nodes. The programs may be stored on a non-transitory computer readable media. The ICDs can also issue control commands to the CDs and to grid management devices co-located with the ICD, such as reclosers, capacitor banks, and voltage regulators. In the present invention, the receiver at the aggregation node can infer schematic and topological information about the ICDs such as the feeder and phase upon which the ICD is sited based on various properties of each ICD's transmissions as detected on one or more of the receiver's inputs. These properties may include signal strength.

The stored programs on the ICDs can carry out control activities for conservation and distribution automation without waiting for orders from a central agency, thus reducing the latency of action as well as the communications load on the network substrate.

Unlike HAN solutions, the optimizations obtained via the methods supported by the present invention are not restricted to upper-end consumers who a) may be less in need of the benefits than other consumers who cannot afford to install home-area networking systems and who b) may therefore be less engaged in energy management than is desirable.

Unlike HAN solutions and local-regulator solutions, the optimizations indicated of the present invention may be applied to aggregations of homes and businesses rather than individual homes and businesses only.

Unlike primarily model-based systems, the present invention provides fine-grained data from all measurement nodes in near-real time rather than relying on a predictive model, whether or not supplemented with a small sample of real-time data points.

Unlike centralized systems, the distributed intelligence in the ICDs provides the ability for applications to react in real-time to transient events such as power surges and sags resulting from external events, load changes, and changes in the distribution grid itself.

Unlike prior art systems based on wireless technologies, the present invention does not require a separate network of wireless towers for transmitters, receivers, collectors, and repeaters to be built between the network edge and the final aggregation point. The system of the present invention works wherever electrical power is available. This provides an advantage over prior systems such as RF and cellular solutions, which tend to work poorly in dense urban areas, places where the electrical infrastructure is under ground, and rural areas where cellular service is unavailable or inadequate and the costs of building RF mesh networks are prohibitively high.

The present invention reduces facilities and operational costs associated with running other smart grid models because the communications substrate (the distribution grid) is owned by the utility and does not require the utility to pay service fees to a wireless service provider.

The present invention improves the accuracy of models and optimizations because it is sensitive to the schematic location of the control points and affected load points, while data collection networks and models based on wireless AMI networks must be chiefly based only on geospatial location and are not sensitive to changes in grid topology such as states of switches and reclosers.

Unlike prior art networks that use cellular wireless as all or part of the data reporting path, backhaul of data does not have to be restricted to off-peak hours.

The present invention, by virtue of being capable of concurrently supporting more real-time reporting and minimizing necessary two-way end-to-end interactions, supports multiple concurrent distribution automation and optimization applications including, but not limited to, conservation voltage reduction, asset protection, demand-side load management, service theft detection, service leakage/loss detection, outage boundary identification, rapid fault isolation, safe recovery management, service quality assurance, predictive failure analysis, restriction of access to service, distributed generation and storage management and optimization, and electric vehicle charging control. Most of these applications may be supported by the same data reports, given that the data can be reported with sufficient frequency and continuity.

DETAILED DESCRIPTION OF THE PREFERRED EMBODIMENT

The present invention is directed generally toward utility service delivery and the use of distributed intelligence and networking in the optimization of utility service delivery, wherein it is beneficial and necessary to establish zones of optimization based on electrical schematic proximity (versus geospatial proximity) of loads on the electrical grid.

Figure 1:
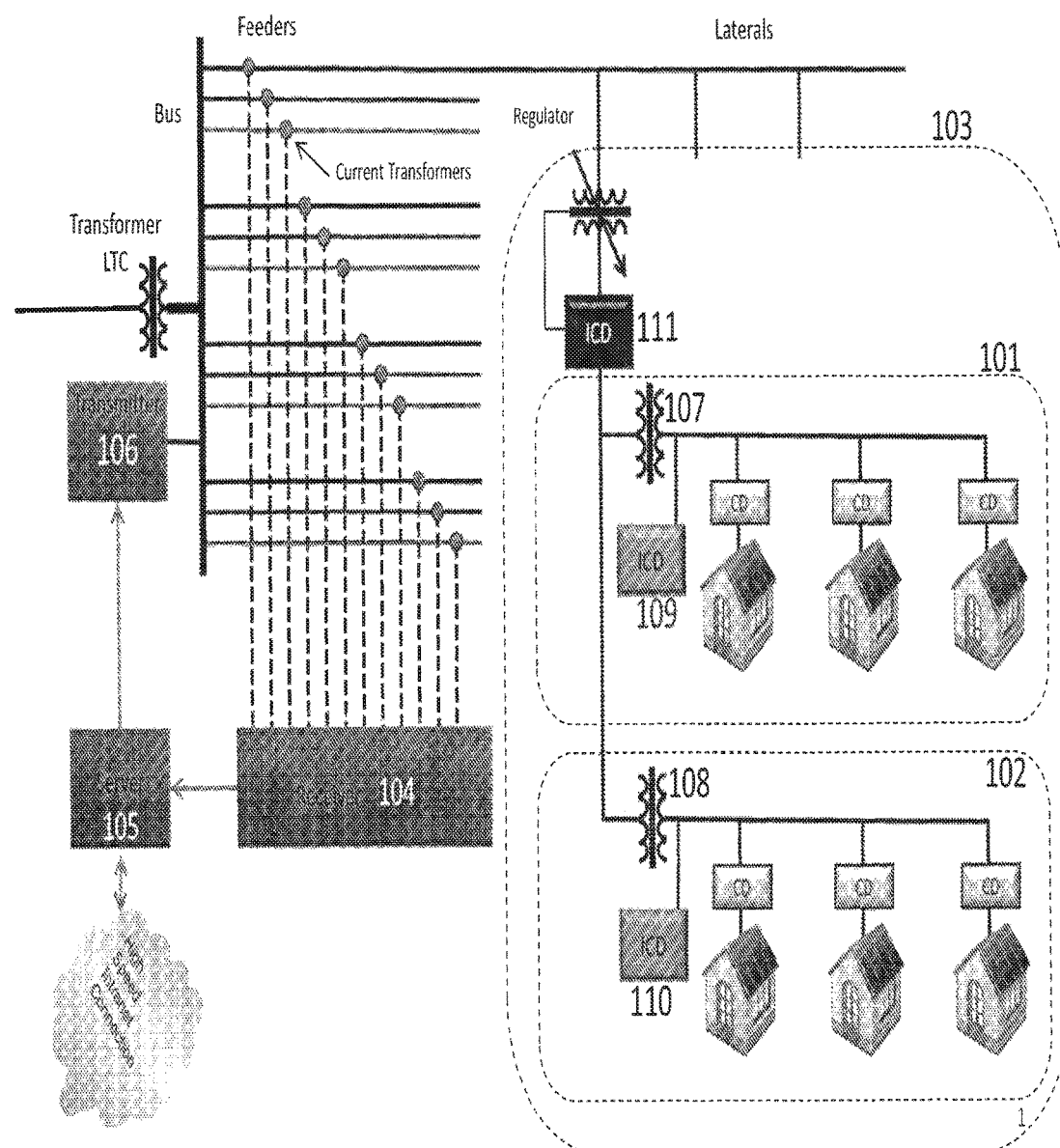
FIG. 1 shows a portion of an electrical distribution grid including one substation of four feeders, the substation containing a Server 105, a Transmitter 106, and a Receiver 104. Served by the substation are a collection of nested Optimization Zones 101, 102, and 103, where Zone 103 contains a Voltage Regular attached to an LCD 111 and two Transformer Area Network (TAN) zones 101 and 102. Zone 101 is served by transformer 107 and contains one ICD 109 sited at transformer 107 and a plurality of CDs sited at the residences in the TAN zone 101. Zone 102 is served by transformer 108 and contains one ICD 110 sited at transformer 108 and a plurality of CDs sited at the residences in the TAN zone 102.

The invention comprises at least one data aggregation point, as shown in FIG. 1, said aggregation point comprising at least one server 105, at least one on-grid receiver 104, and an optional transmitter 106, together with at least one optimization zone. An optimization zone contains at least one intelligent communicating device (ICD) (109, 110, and 111). An optimization zone may additionally contain other optimization zones, a collection of one or more communicating devices (CDs) residing on the low-voltage side of the same electrical service transformer wherefrom said ICD derives its power, and one or more control devices. ICDs may be sited on service transformers at the edge of the grid, but also on low-voltage transformers associated with medium-voltage grid equipment such as voltage regulators, switches, and capacitor banks, which low-voltage transformers may be installed for the purpose of powering monitoring and control equipment including but not limited to said ICD. Optimization zones may additionally include generation sources such as solar arrays and windmills which are monitored and/or controlled by means of CDs or ICDs.

A server 105 at an aggregation point is a standard ruggedized computer server comprising one or more CPUs, RAM, a non-volatile solid-state data store whereon reside programs to be executed by the CPU and data, a local-area network connection by means of which the server communicates with the at least one receiver 104, the optional transmitter 106, and an optional internet gateway. The receiver 104 monitors the SCADA lines attached to the medium-voltage distribution lines leaving the substation or other nodes of interest on the distribution grid by means of current transformers clamped onto said SCADA lines or other points of contact. A current transformer must be provided for each phase of each feeder over which said receiver is expected to receive transmissions from ICDs. Said server executes stored programs which store and forward transmissions from ICDs to client applications on the conventional wide-area network and which additionally may from time to time issue policy changes, control commands, and software updates to the ICDs via said transmitter 106.

The transmitter 106 at an aggregation point may use any of a number of on-grid transmission methods for transmitting from a higher voltage to a lower voltage which are well known in the art, such as audio-frequency ripple control. Said transmitter 106 may also employ an alternative broadcast medium.

An ICD consists of a central processor (CPU), a writable non-volatile storage, volatile random-access memory (RAM), and at least one transmitter subsystem enabling software executing on the CPU to order the long-range transmission of messages over the power grid that can be received by said server 105 via one or more said receiver 104 present on at least one aggregation point. An ICD may optionally contain a separate transceiver subsystem capable of using a local, PLC-type on grid communications protocol such as Prime and G3, which are well known in the art, for two-way communication with CDs located on the low-voltage side of the same transformer which supplies power to said ICD. An ICD may optionally contain a receiver subsystem which may be separate from or combined with the long-range transmission subsystem, capable of receiving transmissions sent either over the grid or via some other medium by a transmitter 106. An ICD may optionally contain inputs from instruments for measuring quantities including but not limited to current, voltage, power factor, temperature, and humidity, and outputs for asserting a signal to a control device such as a switch, such that a software agent executing on the CPU of said ICD may read and store measurements and control said optionally attached devices. Said software agents are stored on said writable non-volatile storage, and may additionally store state information, collected data, and policies on said writable non-volatile storage.

A CD is defined as any device which is a) connected to the electrical power grid at low voltage, and b) contains a transceiver for engaging in two-way communication via a PLC-type local on-grid communications protocol such as G3 or Prime. A CD may contain logic or firmware capable of reading inputs from attached measurement devices and writing commands to controllable devices attached to the CD. CDs are typically embedded in other devices which may include but are not limited to commercial and residential electrical meters, household appliances such as HVAC systems, refrigerators, dish washers, pool pumps, etc., electrical and hybrid vehicles, and charging stations for electrical and hybrid vehicles.

Applications are comprised of distributed intelligent software agents in the form of software programs stored on the nonvolatile writable stores of said ICDs and executing on the CPUs of said ICDs (109, 110, and 111) sited at critical measurement and control points on the grid. Said agents are capable of collecting measurements from CDs in their TAN and from instruments attached to the ICDs. These agents may follow a policy dictating that the agent transmit the collected data or a summary or derivative thereof over the electrical distribution grid to the server 105, or transmit commands to CDs capable of adjusting demand at individual loads (303) or to control locally-attached devices such as voltage regulators (111) which impact the service for an entire zone or collection of zones, said policies being stored on the nonvolatile writable stores of said ICDs. Server 105 may react to transmissions from any ICD by issuing commands via transmitter 106. Said commands may be broadcast or multicast and may be addressed to a single ICD, a collection of ICDs, or all ICDs reachable from said transmitter 106.

In the present invention, the substation receiver 104 infers schematic information about the transmitting ICDs based on the signal characteristics of the received messages on each of the inputs to the receiver, and enhances said received messages with said inferred information. Said inferred information can subsequently be used by distribution automation client applications for the purpose of identifying changes in grid topology, switch states, zone boundaries, outage locations, and the like.

In one embodiment of the invention, an electrical distribution service area is organized into optimization zones based on the characteristics of the areas served by each schematic sub-tree of a radial distribution grid. FIG. 1 illustrates such a schematic sub-tree, comprising an outer zone 103 containing a multiplicity of Transformer Area Network zones (101 and 102). In this embodiment, demand data from the TANs is aggregated at server 105 and transmitted via a conventional wide area network to client applications. Based on an analysis of the aggregated data, distribution optimization equipment, such as capacitor banks, voltage regulators, and switches, may be installed at a plurality of the zones, but it is not a requirement of the invention that any or all zones have optimization devices installed. As illustrated in FIG. 1, a voltage regulator may be installed on the lateral serving zone 103. In this embodiment, conservation of electrical power can be achieved by lowering the voltage supplied by the substation to all zones, and using some combination of capacitor banks and voltage regulators to subsequently adjust the voltage in high-demand or highly variable-demand zones such as zone 103.

In a typical embodiment of the invention, one or more ICDs are deployed for every TAN on the low-voltage side of its service transformer. The ICD may communicate with a multiplicity of CDs powered via said service transformer in the TAN. Communications among the ICDs and CDs typically do not propagate significantly beyond said service transformer. As each ICD is installed on the grid, it transmits a provisioning request on a designated on-grid communication channel which is detected by the receiver 104. The server 105 responds with a provisioning fulfillment message which may be transmitted via transmitter 106 or via a hand-held wireless device carried by the human installer of the ICD. The ICD will re-transmit its provisioning request after a randomized delay if it fails to receive a provisioning fulfillment message within a configurable interval. The fulfillment message contains a plurality of policies enabling resident application agents on the ICD, and for each enabled agent a schedule of time slots when the agent has permission to transmit a data report. In some embodiments of the invention, agents may also transmit asynchronous emergency alerts on the provisioning channel. In other embodiments, multiple channels are dedicated to alerting. In some embodiments, ICDs do not transmit on a schedule but only transmit event-driven alerts. All combinations of scheduled and event-based transmission protocols are within the scope of the present invention.

In the preferred embodiment of the invention, the software and firmware residing on the ICDs, comprising the operating system of the host processors in the ICD, the device drivers for attached instruments and controls, the communications protocol stacks for communicating with locally attached instruments and controls, the communications protocol stacks for communicating with CDs within the TAN, the communications protocol stacks for transmitting and receiving long-range communication over the distribution grid above the TAN, and the software programs implementing the application agents can all be individually and collectively updated over the network. Said updates are broadcast to all ICDs from a central distribution point via the transmitter 106. In the preferred embodiment of the invention, the distribution grid is the communications medium used by transmitter 106. In alternative embodiments the transmitter 106 is permitted to be a wireless network or any alternative network medium that is present. The schematic-awareness aspect of the present invention requires that ICDs must transmit messages on the electrical distribution grid, but transmission on-grid from substation to edge ICDs is not required for schematic awareness. In one embodiment of the invention, transmitter 106 is absent and updates to the ICDs are made by visiting the device or by means of an alternative network path gated via the local ICD-CD communication channel.

In the preferred embodiment of the invention, the rules, policies, goals, and parameters that govern the behavior of the distributed agents can be updated from a central distribution point via the transmitter 106. Distribution of said rules, policies, goals, and parameters is varied and limited by variations in the transmission scheme in various embodiments of the invention in the same manner as are software and firmware updates.

Figure 2:
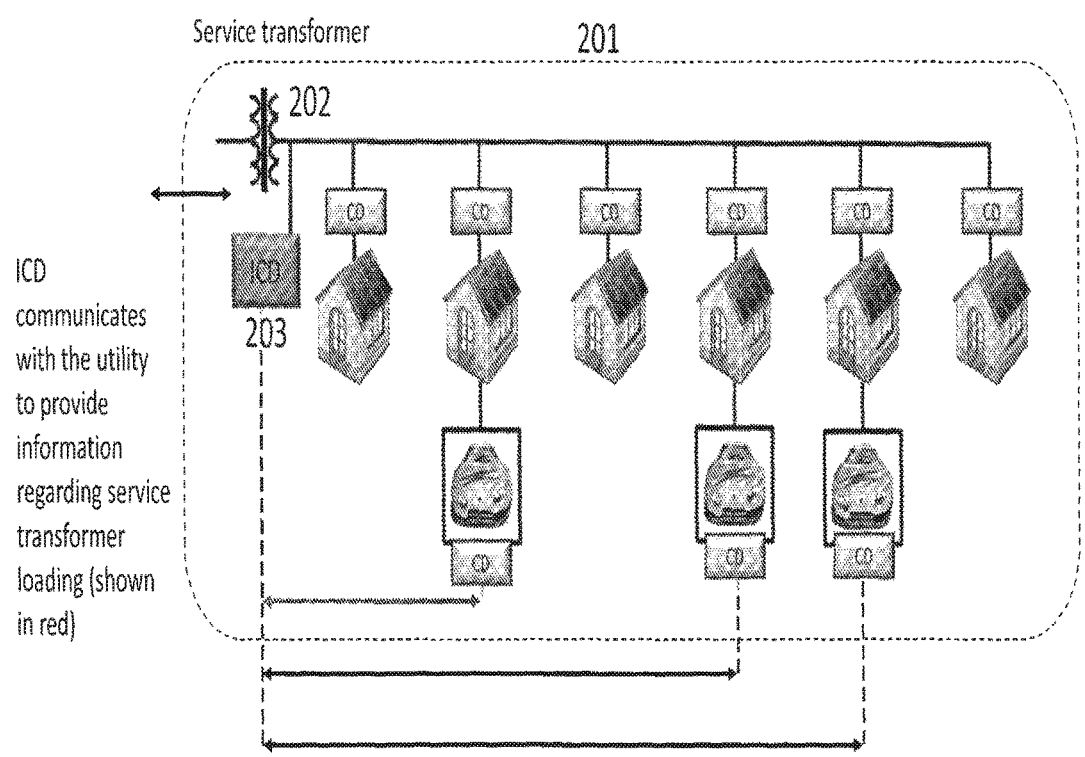
FIG. 2 shows an Optimization Zone 201 having a Transformer Area Network with an ICD 203 which provides for Electric Vehicle Charge management, protecting the Service Transformer 202 against the possibility of overloading due to random uncontrolled charging events.
Figure 3:
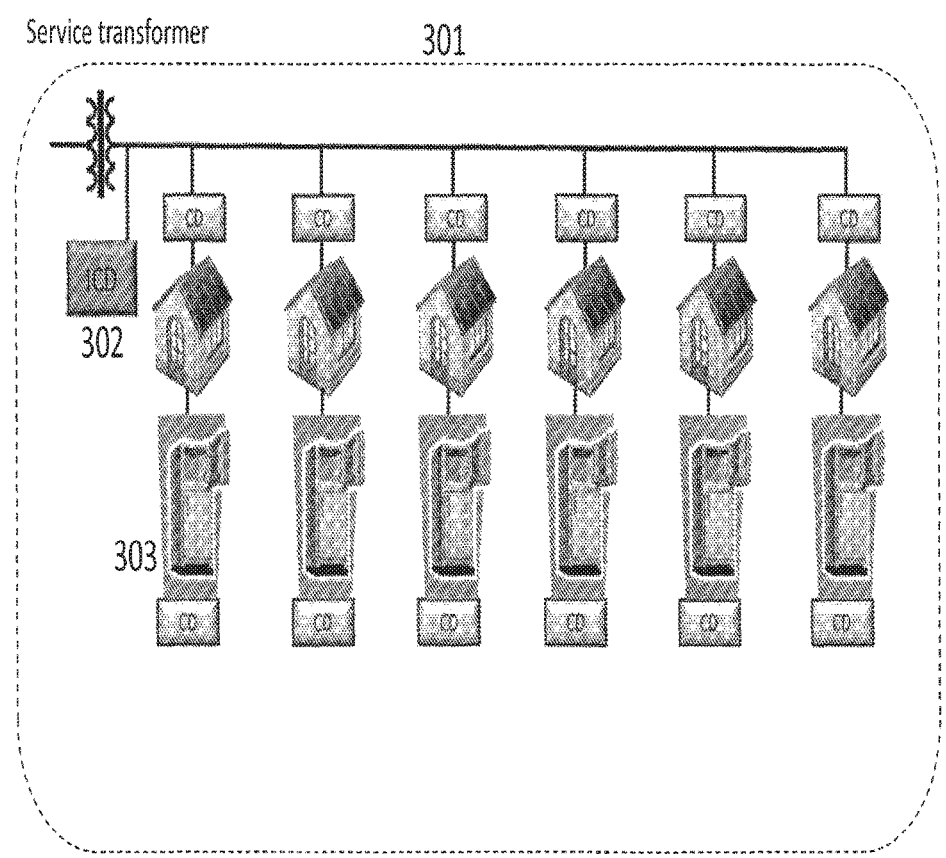
FIG. 3 shows an Optimization Zone 301 having a Transformer Area Network with an ICD 302 which controls a multiplicity of household appliances with embedded CDs as represented by the refrigerators 303. In this configuration, the independent control exerted by the ICD 302 over the embedded CDs 303 allows the ICD to maintain a consistent load over the TAN by staggering the times at which the CDs permit their appliances to engage in high-consumption activities (e.g. cycling the ice-maker, running dishwashers, self-cleaning ovens) while ensuring that all appliances operate within their safety and convenience specifications (e.g. refrigerators keep foods at the proper temperature, dishwashing cycle requested by 10 pm is completed by 6 am the next day).

FIGS. 2 and 3 illustrate embodiments of the invention where CDs are embedded in devices inside a served residence, business, or other consumer. Said devices may include electrical or hybrid vehicles or the charging stations associated with said vehicles. In such embodiments, the ICD 203 can assess the added load that charging an additional vehicle would have on the associated service transformer. Based on the existing and anticipated load, the ICD can grant permission to charge the vehicle or defer the charging of the vehicle until a later date, or implement more complex charging protocol whereby multiple requesting vehicles are served in a round-robin fashion so as to ensure that all vehicles receive at least a partial charge. Additionally, the ICD can report to the central authorizing agency via the long-range on-grid transmission medium the identity of the requesting vehicle, and can suspend the charging process or alert the consumer if the vehicle is not recognized as having permission to charge in that locale.

Using the same local on-grid communications mechanism, the ICD 302 in FIG. 3 can limit the total load at zone 301 by managing the power consumption of appliances with embedded CDs in the residences in the zone, represented by the refrigerators 303.

This description of the preferred embodiments of the invention is for illustration as a reference model and is not exhaustive or limited to the disclosed forms, many modifications and variations being apparent to one of ordinary skill in the art.

What is claimed is:

1. An intelligent communication device (ICD) comprising:
 a first transceiver configured to be coupled to an electric network on a low-voltage side of a service transformer that provides electricity via the electric network to an optimization zone comprising a plurality of locations associated with corresponding electrical meters that measure electricity provided via the electric network to the corresponding locations, the first transceiver configured to communicate via the electric network with a plurality of different control devices communicatively coupled to corresponding electrical devices that are coupled to the electric network at the plurality of locations;
 a second transceiver configured to communicate with a server;
 an input configured to provide electrical characteristics of the low-voltage side of the service transformer; and
 a central processor coupled to the first transceiver and the second transceiver, and configured to:
  receive, via the second transceiver, a policy that identifies an electrical load policy to implement in the optimization zone;
  receive, via the first transceiver, a request from a control device of the plurality of control devices to permit initiation of an activity of a corresponding electrical device;
  determine, via the input, a current electrical characteristic of the low-voltage side of the service transformer; and
  based on a current electric load and the electrical load policy, send a message to the control device via the first transceiver that one of grants the request and denies the request.

2. The ICD of claim 1 wherein to, based on the current electric load and the electrical load policy, send the message to the control device via the first transceiver that one of grants the request and denies the request, the central processor is configured to, based on the current electric load and the electrical load policy, send a message to the control device via the first transceiver that denies the request and directs the control device to initiate the activity at a future designated time.

3. The ICD of claim 1 wherein the central processor is further configured to determine an estimate of an additional load on the electric network associated with the activity of the corresponding electrical device, and based on the current electric load, the electrical load policy, and the estimate of the additional load, send the message to the control device via the first transceiver that denies the request.

4. The ICD of claim 1 wherein to receive, via the first transceiver, the request from the control device to permit initiation of the activity of the corresponding electrical device, the central processor is further configured to receive, via the first transceiver, a request from the control device to permit initiation of charging an electric automobile.

5. The ICD of claim 1 wherein the central processor is further configured to:
  receive, via the second transceiver, a plurality of requests from a group of control devices of the plurality of different control devices, each control device requesting permission to initiate charging of a corresponding electric vehicle; and
  send messages to the group of control devices to implement a round-robin charging of the electric vehicles.

6. The ICD of claim 1 wherein to receive, via the first transceiver, the request from the control device to permit initiation of the activity of the corresponding electrical device, the central processor is further configured to receive, via the first transceiver, the request from the control device to permit initiation of the activity of the corresponding electrical device, the request including an identity of an electric vehicle, and wherein the central processor is further configured to:
  send a message via the second transceiver to the server that includes the identity of the electric vehicle and a location of the control device;
  receive, from the server, a message indicating that the electric vehicle is not authorized to be charged at the location of the control device; and
  send a message to the control device via the first transceiver that denies the request.

7. The ICD of claim 6 wherein the central processor is further configured to send a message to the control device for presentation on a display device that indicates the electric vehicle is not authorized to be charged at the location.

8. The ICD of claim 1 wherein the second transceiver is further configured to be coupled to the electric network and to communicate with the server through the service transformer via an electrical distribution grid which comprises the electric network.

9. A method comprising:
  providing an intelligent communication device (ICD) comprising a central processor and a first transceiver coupled to an electric network on a low-voltage side of a service transformer that provides electricity via the electric network to an optimization zone comprising a plurality of locations associated with corresponding electrical meters that measure electricity provided via the electric network to the corresponding locations, the first transceiver configured to communicate via the electric network with a plurality of different control devices communicatively coupled to corresponding electrical devices that are coupled to the electric network at the plurality of locations;
  receiving, via a second transceiver from a server, a policy that identifies an electrical load policy to implement in the optimization zone;
  receiving, via the first transceiver, a request from a control device of the plurality of control devices to permit initiation of an activity of a corresponding electrical device;
  determining, via an input that provides electrical characteristics of the low-voltage side of the service transformer, a current electrical characteristic of the low-voltage side of the service transformer; and
  based on a current electric load and the electrical load policy, sending a message to the control device via the first transceiver that one of grants the request and denies the request.

10. The method of claim 9 wherein sending the message to the control device via the first transceiver that one of grants the request and denies the request further comprises sending a message to the control device via the first transceiver that denies the request and directs the control device to initiate the activity at a future designated time.

11. The method of claim 9 further comprising determining the estimate of an additional load on the electric network associated with the activity of the corresponding electrical device, and based on the current electric load, the electrical load policy, and the estimate of the additional load, sending the message to the control device via the first transceiver that denies the request.

12. The method of claim 9 wherein receiving the request from the control device to permit initiation of the activity of the corresponding electrical device further comprises receiving, via the first transceiver, a request from the control device to permit initiation of charging an electric automobile.

13. The method of claim 9 further comprising:
  receiving, via the second transceiver, a plurality of requests from a group of control devices of the plurality of different control devices, each control device requesting permission to initiate charging of a corresponding electric vehicle; and
  sending messages to the group of control devices to implement a round-robin charging of the electric vehicles.

14. The method of claim 9 wherein receiving the request from the control device to permit initiation of the activity of the corresponding electrical device further comprises receiving, via the first transceiver, a request from the control device to permit initiation of charging an electric vehicle, the request including an identity of the electric vehicle, and further comprising:
  sending a message via the second transceiver to the server that includes the identity of the electric vehicle and a location of the control device;
  receiving, from the server, a message indicating that the electric vehicle is not authorized to be charged at the location of the control device; and
  sending a message to the control device via the first transceiver that denies the request.

15. The method of claim 14 further comprising sending a message to the control device for presentation on a display device that indicates the electric vehicle is not authorized to be charged at the location.

16. The method of claim 14 wherein the server is coupled to an electrical distribution grid which comprises the electric network, and wherein sending the message via the second transceiver to the server that includes the identity of the electric vehicle and the location of the control device further comprises sending the message via the second transceiver over the electrical distribution grid to the server that includes the identity of the electric vehicle and the location of the control device.

* * * * *